May 4, 1965 A. E. BLUME 3,182,330
VARIABLY SPACED ARRAYS OF WAVE RADIATORS AND RECEIVERS
Filed Sept. 21, 1960
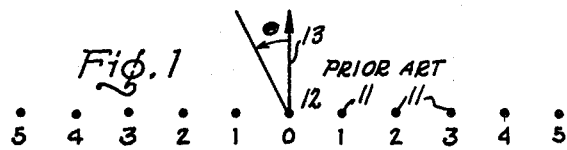
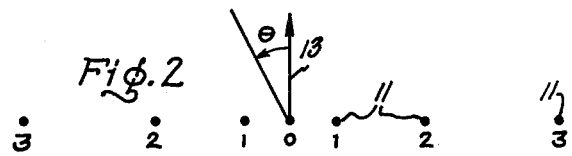
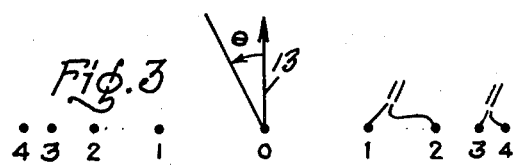
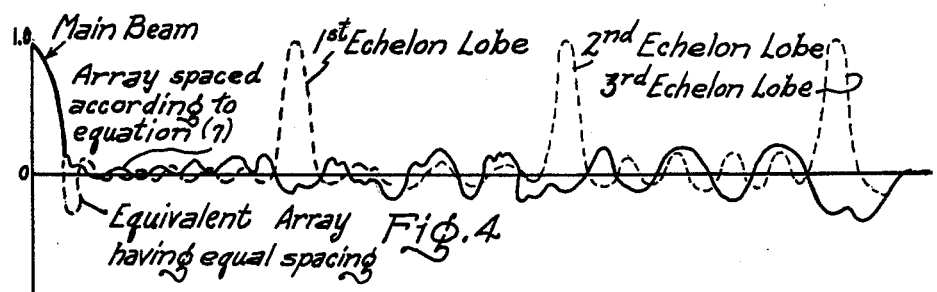
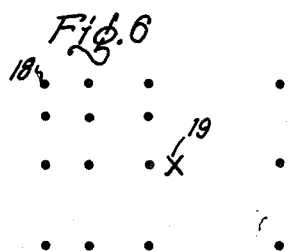
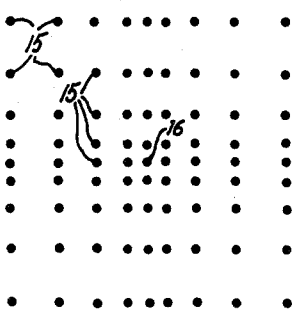
Inventor
Alan E. Blume
by Paul A. Frank
His Attorney

United States Patent Office 3,182,330
Patented May 4, 1965

3,182,330
VARIABLY SPACED ARRAYS OF WAVE RADIATORS AND RECEIVERS
Alan E. Blume, Ballston Lake, N.Y., assignor to General Electric Company, a corporation of New York
Filed Sept. 21, 1960, Ser. No. 57,526
4 Claims. (Cl. 343—844)

This invention relates to radiators or receivers of wave energy and, more particularly, to a plurality of radiating or receiving elements arranged in an array.

It is well known that a plurality of radiating or receiving elements arranged as a linear or planar array and energized in a manner such that the energy radiated has a phase deviation which varies linearly with distance from element to element, can be made to direct the energy radiated therefrom into a lobe pattern extending generally broadside to the array. The specific direction of the main beam pattern is changed, or scanned, by varying the amount of linear phase deviation. When the spacings of the elements are all less than half of a wavelength, there is only one direction in the infinite half plane on either side of a linear array, or in the infinite half space on either side of a planar array, in which the fields radiated from each element are effectively in phase. It is in this direction, the in-phase direction, in which the main beam pattern extends. If the spacings between the elements are equal and are between one-half and one wavelength, other directions may appear, as the amount of linear phase deviation is changed, in which the fields radiated by the individual elements are an integral number of cycles apart in time and are, therefore, effectively in phase. If the spacings are equal and are equal to or greater than one wavelength, one or more of these other directions will always be present. Thus, there are, or may be, depending on the spacing, other directions in which the fields radiated from each element are effectively in phase and the resulting radiation pattern can obtain not only the main beam radiation lobe, but also echelon lobes.

It is well known that the directivity of the individual element radiation pattern can reduce the size of the echelon lobes to some extent, but that it is not practical to use spacings greater than approximately one wavelength when the scan angle of the main beam is small and that spacings as small as one-half wavelength must be used when scan angles are large. To alleviate excessive echelon lobe radiation, relatively small spacing is then mandatory. Thus, a large array; for example, a planar array 100 wavelengths square utilizing a half wavelength spacing, would require a large number of elements; that is, 40,000 elements in the example chosen. Since a large number of elements and, therefore, feed structures, are required to reduce the echelon lobes, it can be seen that beam requirements which necessitate a large array would be very expensive.

It is, therefore, an object of the invention to provide a radiating or receiving array having a reduced number of components.

It is another object of the invention to provide an array having reduced echelon lobes.

It is still another object of the invention to provide an array having enhanced characteristics over previous arrays having the same number of radiating elements.

Briefly stated, in accordance with one aspect of the invention, the elements of an array are variably spaced according to a definite relationship. This relationship is such that the in-phase components of the radiation in undesired radiation directions are greatly reduced. The echelon lobes usually accompanying relatively large element spacing are practically eliminated. At the same time, the variable spacing permits the utilization of considerably fewer elements than would be necessary if the spacing were uniform and kept low enough to prevent echelon lobes from appearing.

The invention, both as to its organization and operation, together with further objects and advantages thereof, may best be understood by reference to the following description taken in connection with the accompanying drawings in which:

FIG. 1 is a diagrammatic illustration of a linear array having conventional uniform spacing;

FIG. 2 is a diagrammatic illustration showing a linear array spaced according to the teachings of the invention;

FIG. 3 is a diagrammatic illustration showing a modification of the array of FIG. 2;

FIG. 4 is a representative graph showing the effects of spacing an array according to the invention;

FIG. 5 is a diagrammatic illustration showing a planar array spaced according to the invention; and FIG. 6 is a diagrammatic illustration showing a modification of the planar array of FIG. 5.

While in the following my invention will be described in connection with an electromagnetic radiator, the principles apply equally to other types of wave radiators; e.g., acoustic radiators, and to receivers of wave energy.

Referring to FIG. 1, a linear array having conventional uniform spacing is shown. The elements 11 are numbered successively from a reference point 12 which, for purposes of illustration, is coincident with the array center. The elements 11 may be any type of radiating structures, such as dipoles, slotted wave guides, dielectric rods, traveling-wave-slots, or any type of structure suitable for transmitting electromagnetic radiations. Correspondingly, the energy sources and the feed structures supplying the elements with radiating energy may take any form suitable for use with the type of element chosen. The broadside direction with reference to the linear array shown in FIG. 1 is indicated generally by the arrow 13. It will be understood that the array of FIG. 1 may radiate an identical pattern in a direction opposite to the arrow 13. However, for simplicity of analysis, the radiation is considered only on one side of the array; that is, in the infinite half plane. The main radiation beam may deviate from the broadside direction and, in these circumstances, the direction is usually measured from broadside as indicated by the angle $\theta$ in FIG. 1. The electric field E, as a function of the radiation angle from broadside $\theta$ for the far field of an array such as shown in FIG. 1 may be expressed:

$$(1) \quad E(\theta) = \sum_{h=-m}^{m} G_h(\theta) B_h e^{i(-V_h \sin \theta)} e^{i\alpha_h}$$

where:

$h$ = the number of any element counting from a reference point in the array
$E(\theta)$ = electric field in the far field of array
$\theta$ = angle from broadside
$G_h(\theta)$ = individual electric field of $h^{th}$ element
$B_h$ = relative excitation magnitude of the $h^{th}$ element
$\alpha_h$ = relative time phase of $h^{th}$ element
$V_h$ = algebraic distance of the $h^{th}$ element from center in radians
    = $2\pi d_h/\lambda$; $\lambda$ is wavelength and $d_h$ is distance in same units
$m$ = total number of elements from center to the edge of the array.

If we define the electric field array factor as:

$$(2) \quad A_0(\theta) = \sum_{h=-m}^{m} B_h e^{i(-V_h \sin \theta)} e^{i\alpha_h}$$

and assume elements with identical individual electric fields, then Equation 1 may be rewritten:

(3) $$E(\theta) = G(\theta) \cdot A_0(\theta)$$

where $G(\theta)$ is the element pattern (same for all elements since we are using identical elements).

Since it is customary to utilize linear phase deviations across the array, we may let:

(4) $$\alpha_h = -KV_h$$

submitting Equation 4 into Equation 2:

$$A_0(\theta) = \sum_{h=-m}^{m} B_h e^{i(-V_h \sin \theta)} e^{i(-KV_h)}$$

$$A_0(\theta) = \sum_{h=-m}^{m} B_h e^{-iV_h(\sin \theta + K)}$$

(5) $$A_0(\theta) = \sum_{h=0}^{m} \epsilon_h B_h \cos[V_h (\sin \theta + K)_x], \text{ if } B_h = B_{-h}$$

where $\epsilon_h = 1$ when $h=0$, and $\epsilon_h = 2$ when $h>0$.

Then we may write:

(6) $$E(\theta) = G(\theta) \sum_{h=0}^{m} \epsilon_h B_h \cos[V_h (\sin \theta + K)]$$

which describes the electric field in the far field of the array. It will be noted that if the spacing between elements is equal, such as shown in FIG. 1, the extent of the linear array (the distance between the outermost elements) is:

$$\text{Extent} = 2mV$$

That this is true may be seen by the fact that the algebraic distance from the array center to the $h^{th}$ element ($V_h$) may be defined as the number of the element ($h$) starting with the center element as zero, times the average spacing ($V$), or:

$$V_m = mV$$

which is the distance from the center to the edge of the array. The extent of the linear array is twice this distance, or, $2mV$. Thus far, we have described the electric field in the far field of the array in terms of the array parameters. The above description is true for an array having an odd number of elements. However, a similar treatment can be afforded to an array of even number of elements symmetrically arranged about a reference point.

Referring to FIG. 2, a linear array is shown having the variable spacing of the successive elements predetermined in accordance with the teachings of the invention. The arranging of the elements in other than their normal uniform spacing may be termed perturbing; that is, the elements are perturbed or repositioned from the spaces they would normally occupy in a conventional array. As in FIG. 1, the elements of FIG. 2 are numbered progressively from the center of the array, and the deviation of the main beam from broadside is given in terms of $\theta$. The elements 11 are spaced progressively farther apart as the distance from the reference point 12 increases. The reference point 12 is coincident with the array center. However, in some circumstances the reference point may be located at other than the array center, as will become apparent hereinafter.

If the spacing is unequal, such as shown in FIG. 2, unusual and unexpected advantages are obtained if the spacings follow the equation:

(7) $$V_h = hV\left(\frac{am^b + h^{b-1}}{m^{b-1}}\right)\left(\frac{1}{am+1}\right)$$

where $a$ and $b$ are parameters which may be defined:

$a$ = relative magnitude of perturbation
$b$ = perturbation index

By definition:

$$V_h = \frac{2\pi d_h}{\lambda}$$

then Equation 7 may be expressed in terms of the linear units of $d_h$:

(8) $$d_h = \frac{\lambda hV}{2\pi}\left(\frac{am^b + h^{b-1}}{m^{b-1}}\right)\left(\frac{1}{am+1}\right)$$

where $\lambda$ is the wavelength and $d_h$ is the distance from the reference point (the center element in the example chosen) to the $h^{th}$ element.

The extent of the array is not changed even though the spacings may become progressively greater; that is:

When $h=m$ $$V_m = mV\left(\frac{am^b + m^{b-1}}{m^{b-1}}\right)\left(\frac{1}{am+1}\right)$$

$$= mV\left(\frac{am+1}{am+1}\right)$$

$$= mV$$

and the extent is $2mV$, the same extent as for equal spacing. Thus, while an array having element spacing according to Equation 8 can occupy the same total space as an array having the same number of elements but with equal spacing, the variable spacing of my array provides different and improved electric field characteristics, as will be seen.

One of the most important features of an antenna array having its spacing perturbed in accordance with the teachings of the invention is the reduction of echelon lobe level. Referring to FIG. 4, the relative electric field array factor of an equally spaced array and an equivalent array of the invention perturbed according to Equation 8 is shown. To facilitate the explanation of FIG. 4, refer to Equation 5:

$$A_0(\theta) = \sum_{h=0}^{m} \epsilon_h B_h \cos[V_h(\sin \theta + K)]$$

If the spacing is equal, then $$V_h = hV$$

and $$A_0(\theta) = \sum_{h=0}^{m} \epsilon_h B_h \cos[hV(\sin \theta + K)]$$

Then let $$\gamma = V(\sin \theta + K)$$

substituting, (9) $$A(\gamma) = \sum_{h=0}^{m} \epsilon_h B_h \cos h\gamma$$

Thus, $A(\gamma)$ has the period of $2\pi$ in $\gamma$.

Further, when $\gamma = 0, 2\pi, 4\pi, \ldots$ $$A(n2\pi) = \sum_{h=0}^{m} \epsilon_h B_h$$

$n = 0, 1, 2, \ldots$

The beam peak occurs at $n=0$; the echelon lobes occur at $n=1, 2, 3, \ldots$ Usually, radiation patterns are normalized so that the maximum value is 1. Thus $$A_n(\gamma) = \frac{A(\gamma)}{A(0)}$$

If the spacing is perturbed according to the invention, and $$V_h = hV\left(\frac{am^b + h^{b-1}}{m^{b-1}}\right)\left(\frac{1}{am+1}\right)$$

$$A_0(\theta) =$$

$$\sum_{h=0}^{m} \epsilon_h B_h \cos\left[hV(\sin \theta + K)\left(\frac{am^b + h^{b-1}}{m^{b-1}}\right)\left(\frac{1}{am+1}\right)\right]$$

Then let $V(\sin \theta + K) = \gamma$ as before, and Equation 9 may be rewritten to include the perturbations:

(10)
$$A(\gamma) = \sum_{h=0}^{m} \epsilon_h B_h \cos\left[h\gamma\left(\frac{am^b + h^{b-1}}{m^{b-1}}\right)\left(\frac{1}{am+1}\right)\right]$$

FIG. 4 is a graph showing a comparison of a linear array having equal spacing, and an equivalent array incorporating the teachings of the invention. Since the electric field in the far field of an array may be expressed:

$$E(\theta) = G(\theta) \cdot A_0(\theta) \text{—Equation 3}$$

and since $G(\theta)$ was assumed the same for all elements, $E(\theta)$ is proportional to $A_0(\theta)$. It was shown previously that $A_0(\theta)$ may be expressed in terms of the array factor $A(\gamma)$, and, more conveniently, in terms of the normalized array factor:

$$A_n(\gamma) = \frac{A(\gamma)}{A(0)}$$

The abscissa of the graph shown in FIG. 4 is thus in terms of $\gamma$, and the ordinate is in terms of the normalized array factor $A_n(\gamma)$. The example chosen included uniform excitation magnitude of all elements ($B_h = 1$), and a total of 61 elements ($m = 30$). The perturbation parameters chosen were:

$a$(relative perturbation magnitude) $= \frac{1}{60}$ $b$(perturbation index) $= 3$ The minimum spacing may be expressed:

$$V_1 = V\left(\frac{am^b + h^{b-1}}{m^{b-1}}\right)\left(\frac{1}{am+1}\right)$$

where $h = 1$ because the first element is the one under consideration.

If
$$am^b \gg 1$$
which will be the case in most situations of interest,
$$V_1 \doteq V\left(\frac{am}{am+1}\right)$$

In the example chosen,
$$V_1 = V\frac{(0.5)}{(1.5)} = 0.333V$$

The maximum spacing is
$$V_m - V_{m-1}$$
and
$$V_m = 30V \text{ (since } m = 30\text{)}$$

$$V_{m-1} = (m-1)V\left[\frac{am^b + (m-1)^{b-1}}{m^{b-1}}\right]\frac{1}{am+1}$$

$$= (m-1)V\left[am + \frac{(m-1)^{b-1}}{(m)}\right]\frac{1}{am+1}$$

In the example chosen
$$V_{m-1} = 29V[0.5 + 0.934]0.666 = 27.70$$
then
$$V_m - V_{m-1} = 2.30$$

The ratio of maximum to minimum spacing is, therefore,
$$\frac{2.30}{.333} = 6.9$$

It may be seen that a variation of the parameter "$a$" varies the ratio of the array extent to the spacing of the innermost elements, and the parameter "$b$" indicates the rapidity with which the successive spacings vary relative to each preceding spacing.

It will be noted that the perturbation index "$b$" need not be an integer, or a constant, and it is possible for the perturbation index "$b$" to be a complicated variable. Generally, a perturbation index greater than one will be most useful; an index greater than one indicates that the successive spacings between elements are progressively greater as the distance from the reference points increases.

In FIG. 4, the solid line curve illustrates the electric field pattern for an atenna constructed according to my invention while the dashed line curve illustrates the electric field pattern of an equivalent array; that is, an array having the same number of elements of the same extent but equally spaced. In one such array constructed according to my invention in which $a = \frac{1}{60}$, $m = 30$, and $b = 3$, it was found that the first side lobe level was 13 db below the main beam level while the side lobe level to a point past the first echelon lobe of the equivalent array was never greater than 11 db. Also, the side lobe level to a point past the third echelon lobe of the equivalent array was never greater than 7 db.

In some situations, it may be found to be advantageous to utilize an array having progressively smaller spacings as the distance from the reference point increases. In such a case, the perturbation index "$b$" may be smaller than one. An antenna array spaced according to Equation 8 and having a perturbation index less than one is shown in FIG. 3. The elements 11 are symmetrically placed about a reference point such as, for example, the array center 12. It can be seen that the array of FIG. 3 includes element spacing which becomes progressively smaller as the distance from the reference point increases.

FIG. 5 shows a planar array of radiating elements 15 spaced according to the teachings of the invention. It will be noted that successive spacings between elements increase progressively from the reference point 16 according to Equation 8. The planar array shown in FIG. 6 is also spaced according to Equation 8 although the array is not balanced; that is, the elements are progressively spaced greater distances from each other as the distance to the reference point 18 increases, and the reference point is not coincident with the array center 19.

It will be obvious to those skilled in the art that many variations of the teachings disclosed and described herein may be made without departing from the spirit and scope of the invention, and, therefore, this invention is to be considered as limited only in accordance with the features thereof as set forth in the claims appended hereto.

What I claim as new and desire to secure by Letters Patent of the United States is:

1. An antenna array for the reception or radiation of wave energy comprising a reference point, a plurality of antenna elements, said antenna elements being perturbed in a definite mathematical relation for reducing echelon lobe radiation, the perturbation index for said mathematical relationship being such that said plurality of antenna elements are spaced progressively closer to each other as the distance from said reference point increases, at least one of said elements being spaced more than one-half wave length from any other of said elements.

2. A linear antenna array for the reception or radiation of wave energy having a plurality of antenna elements arranged symmetrically about the array center, said antenna elements being perturbed in a definite mathematical relationship for reducing echelon lobe radiation, the perturbation index for said mathematical relationship being such that said plurality of antenna elements are spaced progressively closer to each other as the distance from the array center increases, said antenna elements being spaced greater than one-half wave length from each other over a portion of said linear array.

3. An antenna array comprising a reference point and a plurality of antenna elements spaced according to the equation $$d_h = \frac{\lambda h V}{2\pi}\left(\frac{am^b + h^{b-1}}{m^{b-1}}\right)\left(\frac{1}{am+1}\right)$$

where $d_h$ is the distance from said reference point to the $h^{th}$ element, $\lambda$ is the wave length for which the array is to be used expressed in the units as $d_h$, $h$ is the number of the element counting from the reference point, $V$ is the average spacing between elements of the array, $m$ is the number of the element most distant from the reference point, $a$ is a parameter indicative of the ratio of the array extent to the spacing of the closest elements, and $b$ is a parameter indicative of how rapidly the successive spacings between elements vary as the distance from said reference point increases.

4. A linear antenna array having a plurality of antenna elements arranged symmetrically about the array center and spaced according to the equation.

$$d_h = \frac{\lambda h V}{2\pi}\left(\frac{am^b + h^{b-1}}{m^{b-1}}\right)\left(\frac{1}{am+1}\right)$$

where $d_h$ is the distance from the array center to the $h^{th}$ element, $\lambda$ is the wave length for which the array is to be used expressed in the same units as $d_h$, $h$ is the number of the element counting from the array center, $V$ is the average spacing between elements of the array, $m$ is the number of the element most distant from the array center, $a$ is the parameter indicative of the ratio of the array extent to the spacing of the closest elements, and $b$ is a parameter indicative of how rapidly the successive spacings between elements vary as the distance from said reference point increases.

References Cited by the Examiner
UNITED STATES PATENTS

| | | | |
|---|---|---|---|
| 1,595,166 | 8/26 | Scheller | 343—845 |
| 1,808,869 | 6/31 | Stone | 343—844 |
| 1,908,595 | 5/33 | Franklin et al. | 343—853 |
| 1,922,115 | 8/33 | Stone | 343—846 |
| 2,192,532 | 3/40 | Katzin | 343—811 |
| 2,419,562 | 4/47 | Kandoian | 343—854 X |

CHESTER L. JUSTUS, *Primary Examiner.*